United States Patent
Dorris, III et al.

(10) Patent No.: US 8,960,607 B2
(45) Date of Patent: Feb. 24, 2015

(54) CONTAINER DELIVERY SYSTEM RAPID DEPLOYMENT DEVICE

(75) Inventors: John Dorris, III, Cypress, CA (US); John Anthony Skorupa, Huntington Beach, CA (US); William Worden Cleary, Pasadena, CA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 13/249,756

(22) Filed: Sep. 30, 2011

(65) Prior Publication Data

US 2013/0082145 A1    Apr. 4, 2013

(51) Int. Cl.
   *B64C 1/22* (2006.01)
   *B64C 1/20* (2006.01)
   *B64D 1/12* (2006.01)
   *B64D 1/10* (2006.01)

(52) U.S. Cl.
   CPC ... *B64D 1/12* (2013.01); *B64D 1/10* (2013.01)
   USPC ...................................... 244/137.1; 414/517

(58) Field of Classification Search
   USPC ............ 244/137.1, 118.1, 137.4, 105, 100 A, 244/101; 414/509, 511, 517
   See application file for complete search history.

(56) References Cited

U.S. PATENT DOCUMENTS

| | | | | |
|---|---|---|---|---|
| 3,140,076 A * | 7/1964 | Steadman | ...................... | 414/511 |
| 3,209,929 A * | 10/1965 | Petersen et al. | ................ | 414/676 |
| 3,273,728 A * | 9/1966 | Kelso | ............................. | 414/513 |
| 4,044,899 A * | 8/1977 | Booher | ......................... | 414/517 |
| 4,431,360 A * | 2/1984 | Maeno | .......................... | 414/517 |
| 4,475,862 A * | 10/1984 | Paulsson et al. | .............. | 414/513 |
| 4,487,120 A * | 12/1984 | Barstow | ........................ | 414/345 |
| 4,520,975 A * | 6/1985 | Blackhurst | ................. | 244/137.4 |
| 5,279,199 A * | 1/1994 | August | ........................... | 89/1.51 |
| 5,333,528 A * | 8/1994 | Klestadt et al. | ................. | 89/1.51 |
| 5,395,204 A * | 3/1995 | Balik | ............................. | 414/517 |
| 5,468,117 A * | 11/1995 | Lobko et al. | ................... | 414/809 |
| 7,252,270 B2 * | 8/2007 | Mitzmacher | ................ | 244/171.3 |
| 7,395,761 B2 * | 7/2008 | Bittle et al. | ................. | 244/137.4 |
| 7,980,805 B1 * | 7/2011 | Holmes et al. | ................. | 414/517 |
| 2002/0074456 A1 * | 6/2002 | Marrero | ....................... | 244/137.1 |
| 2009/0028677 A1 * | 1/2009 | Williams et al. | .............. | 414/345 |
| 2009/0127376 A1 * | 5/2009 | Gomez et al. | ...................... | 244/2 |
| 2009/0311085 A1 * | 12/2009 | Haub et al. | ..................... | 414/513 |

* cited by examiner

*Primary Examiner* — Rob Swiatek
*Assistant Examiner* — Marc Burgess
(74) *Attorney, Agent, or Firm* — Hope Baldauff, LLC

(57) ABSTRACT

A pneumatic deployment device ("PDD") assists in ejecting containerized cargo bundles from a cargo aircraft during an airdrop. The PDD includes a first structure affixed to the aircraft and a second moveable structure, and which is positioned against a cargo bundle, referred to as a CDS bundle. Typically, a series of CDS bundles are positioned along a line in the cargo hold of the aircraft. A pressurized tank provides compress gas to an airbag that is positioned between the first structure and the second structure. Upon reaching the drop location, the gas is release from the tank to the airbag via a hose, inflating the airbag. The airbag pushes the second structure against the CDS bundle, so that the cargo bundles are ejected faster from the aircraft than would otherwise occur.

18 Claims, 7 Drawing Sheets

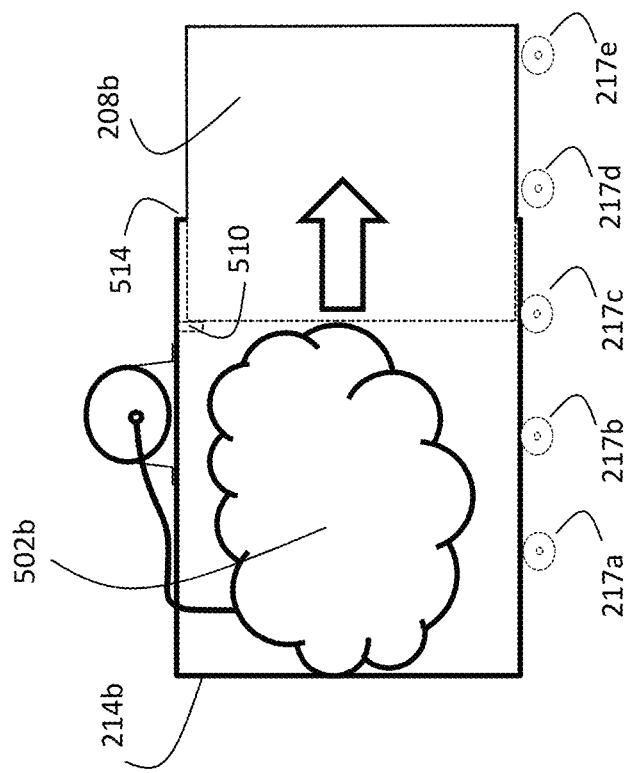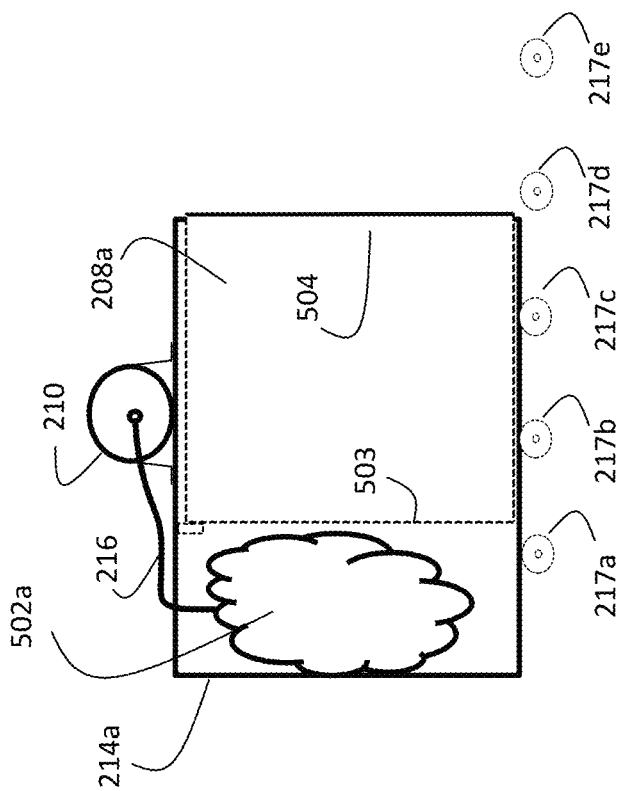

CONTAINER DELIVERY SYSTEM RAPID DEPLOYMENT DEVICE

BACKGROUND

Airdropping cargo is a common approach for providing materials or supplies (collectively called "cargo") to remote or hostile areas for supporting military troops. In military applications, airdropping cargo allows resupplying forward areas where ground transport of cargo is not feasible. Airdropping cargo can also be used in non-military applications, such as delivery of emergency or relief supplies. In these situations, aircraft can airdrop relief supplies where circumstances may not tolerate the delay associated with ground transportation.

Airdropping cargo has been facilitated by use of global positioning system ("GPS") technology that allows an accurate indication of the aircraft's current position with respect to the intended drop location on the ground. A computerized system on-board the aircraft receives real-time indications of the aircraft's position, speed, and altitude, as well as other factors, and computes the proper drop position for the aircraft. Once near the drop zone, the cargo ramp and door are opened and an indication is provided for releasing the cargo.

The cargo can include a number of pallets that are airdropped, and there is a time period between the first pallet exiting the aircraft and the last pallet exiting the aircraft. During this time, the aircraft continues to travel along its course. This results in the pallets landing in the drop zone in a spaced-apart, linear manner. The further the pallets are spaced-apart in the drop zone, the more this can complicate recovery of the cargo by ground personnel. Minimizing the time period between deployment of the first pallet and the last pallet can facilitate recovery of the cargo on the ground.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

The disclosure is generally directed to systems and methods for deploying containerized cargo on pallets. The containerized cargo is often referred to those skilled in the art as container delivery system ("CDS") bundles. More specifically, the concepts and technology disclosed herein provides for more rapid deployment of multiple CDS bundles from a cargo aircraft.

In one embodiment disclosed herein, a system for deploying cargo from an aircraft includes a structural frame configured for attachment to an aircraft floor, a movable ram connected to the frame and configured to move from a first position to an aft position, and an ejection mechanism connected to the frame and the ram, the ejection mechanism configured to move the ram in the aft direction thereby accelerating a cargo container from a first position to a second position.

In another embodiment disclosed herein, a pneumatic delivery deployment device includes a structure configured to be affixed to a cargo aircraft, a ram configured to engage a cargo element and movably coupled to the structure configured to slideably disengage with the structure, and an airbag configured to inflate upon receiving the pressurized gas located between the structure and the ram. The airbag is further configured to inflate upon receiving pressurized gas, wherein upon inflation the airbag accelerates the ram away from the fixed structure.

In another embodiment disclosed herein, a method for deploying cargo that includes one or more container delivery system ("CDS") bundles includes the operations of flying a cargo aircraft conveying a plurality of CDS bundles, and inflating an airbag positioned between a structure and a moveable ram, and moving the ram to contact a cargo pallet thereby accelerating the ram and causing at least one of the CDS bundles to accelerate.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 5A and 5B illustrate a side view of components of the pneumatic delivery device at two different stages of deployment according to one embodiment disclosed herein.

DETAILED DESCRIPTION

Figure 1:
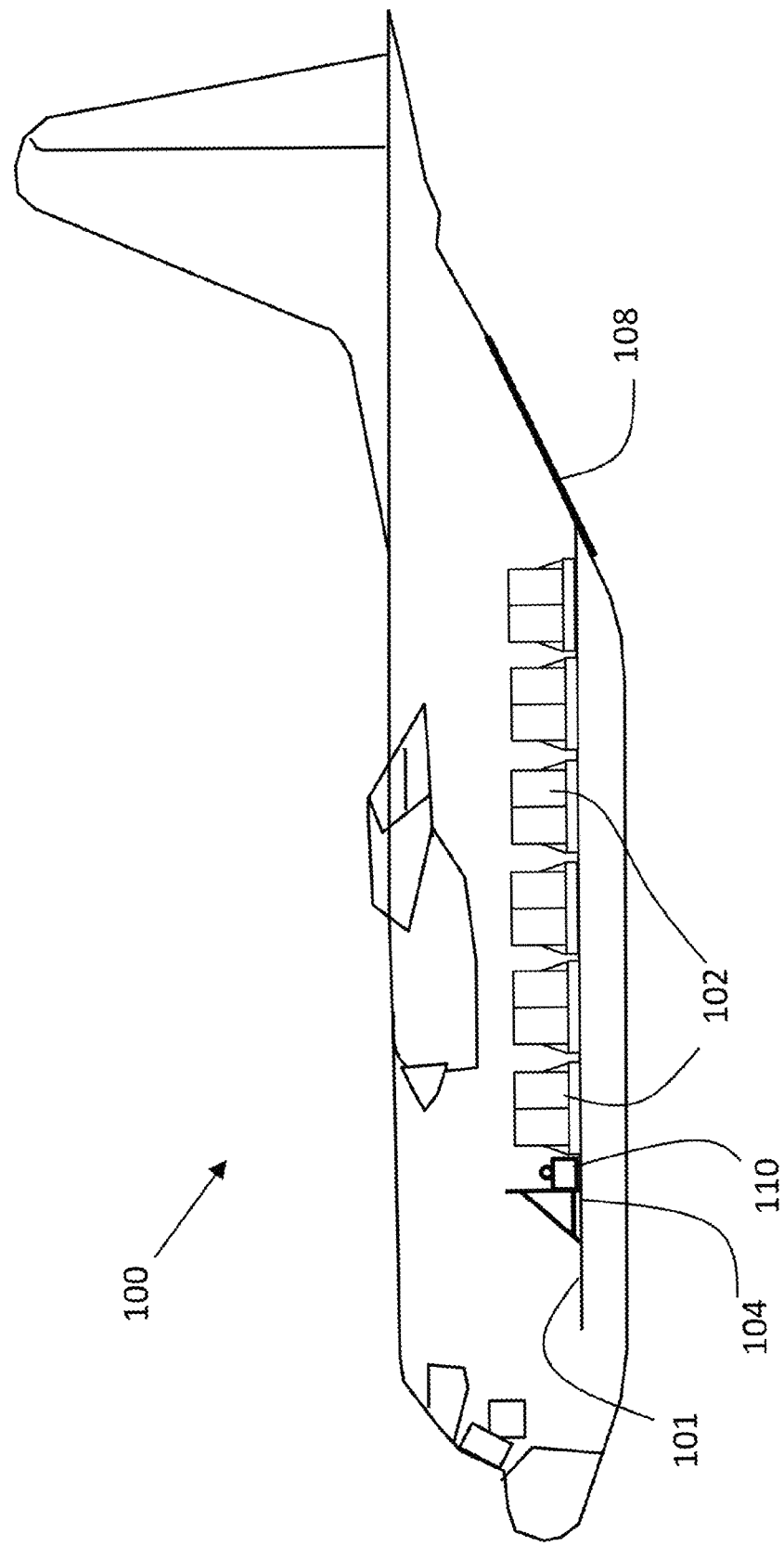
FIG. 1 illustrates a cross-sectional view of a cargo aircraft incorporating a pneumatic delivery device according to one embodiment disclosed herein.

The following detailed description is generally directed to deploying containerized cargo on pallets. Specifically, the concepts and technology disclosed herein provides for more rapid ejection of one or more containerized cargo bundles from a cargo aircraft.

Airdropping cargo is useful for providing supplies to military personnel in military operations as well as to humanitarian workers in emergency relief operations. Typically, cargo aircraft designed for conveying cargo are used in airdrop operations. Cargo aircraft typically have a large cargo hold in the fuselage and a door in the aft section allowing the cargo to exit during flight.

The cargo is often strapped to pallets of a standard size and the pallets are configured to slide over rollers integrated into the cargo floor of the aircraft and engage in rails attached to the cargo floor. One such system used by the military is referred to as a container delivery system ("CDS") and the cargo and the pallet are referred to as a CDS bundle. Although the concepts and technologies are illustrated herein by referencing a CDS bundle, the concepts and technologies can apply to other types of cargo deployment systems, and should not be interpreted as solely for use in military applications.

A CDS bundle can vary in size, and in one embodiment each CDS bundle may be approximately 4' wide, 4' deep, and 5' high. If multiple CDS bundles are to be deployed, they are loaded in a linear manner into the cargo hold of the aircraft. Each CDS bundle can be moved on rollers incorporated into the cargo hold and may be guided along and between two parallel rails that aid in securing the CDS bundle in position during flight. It is important that the CDS bundles are secured during flight, and do not shift position due to motion of the aircraft. The rails prevent the CDS bundle from any vertical or lateral motion. A buffer stop assembly at the end of the rails prevents the CDS bundles from moving forward, and a strap on the last CDS bundle loaded prevents it (and the other CDS bundles) from moving aft.

Once airborne, the drop location can be determined by the aid of GPS technology. A computerized system considers various factors, including speed of the aircraft, altitude, weight of the CDS bundle, GPS coordinates, and informs the loadmaster of the approach of the drop zone. Upon reaching the drop zone, the cargo ramp and door are opened, and the pilot adjusts the deck angle of the aircraft at a slight angle, which can be about seven degrees nose-up in one embodiment. Creating a positive deck angle causes the last CDS bundle to exert a force against the strap that prevents all of the CDS bundles from moving aft. At the appropriate time, a computerized system indicates the appropriate release point is reached and the strap is detached or cut. The CDS bundles are free to roll and fall out of the cargo hold.

Depending on the cargo aircraft, it is not uncommon to have 16 to 20 bundles positioned in a column for deployment. Each bundle takes a finite amount of time to roll off the aircraft, and because they are linearly placed in the cargo hold, it can take several seconds for all the CDS bundles to fall out. During this time, the cargo aircraft can be traveling at 130-140 knots (approximately 160-170 mph). Consequently, the duration between the first CDS bundle exiting the aircraft and the last CDS bundle exiting can translate to a wide distance on the ground. Depending on various factors, this can be up to a mile long. Thus, the faster the CDS bundles leave the aircraft, the less ground distance that will be travelled, and the closer the CDS bundles will land.

One embodiment of the technology is shown in FIG. 1. FIG. 1 shows a context for using the technology and depicts a cross sectional view of a cargo aircraft 100. Various types of cargo aircraft can be used, and any similarity to any particular manufacturer or model of cargo aircraft should not be construed as limiting the concepts herein to that aircraft.

The cargo aircraft contains a linear series of CDS bundles 102 in the cargo hold. Specifically, six CDS bundles 102 are shown on the floor 101 of the cargo bay. For purposes of illustration, a greater or lesser number of CDS bundles 102 can be used in practice. The cargo door 108 is shown closed, but is opened once the CDS bundles are to be deployed. A buffer stop assembly ("BSA") 104 is located to prevent the CDS bundles 102 from moving forward.

Between the BSA 104 and the CDS bundles 102 is located a pneumatic delivery device ("PDD") 110. The PDD functions to push on the CDS bundles upon command, thereby increasing their exit velocity, and accelerating their departure out of the cargo hold. In a typically embodiment, the pallet of the CDS bundle may be pushed. In other embodiments the CDS itself may be pushed by the PDD. Typically, the PDD is activated to deploy the CDS bundles at, or shortly after, the holding strap is disengaged (not shown in FIG. 1.) By actively pushing the CDS bundles 102 out of the aircraft, the effects of inertia of the CDS bundles are reduced and the time to deploy the CDS bundles is reduced. In one embodiment, it is thought to reduce the time by 25%. Reducing the time the CDS bundles exit the aircraft reduces the spread of the CDS bundles on the ground and this facilitates retrieval of the cargo by ground personnel.

In the embodiment illustrated in FIG. 1, the BSA is illustrated as a separate component from the PDD, although the PDD is designed to operate with the BSA. In other embodiments, the PDD may be integrated with the BSA, or partially integrated with the BSA to facilitate installation. In other embodiments, a structure providing the same function as the BSA may be present in the aircraft, so that no separate BSA structure is required to be installed. In one embodiment as shown in FIG. 1, the PDD is positioned between the BSA and one or more CDS bundles.

Figure 2:
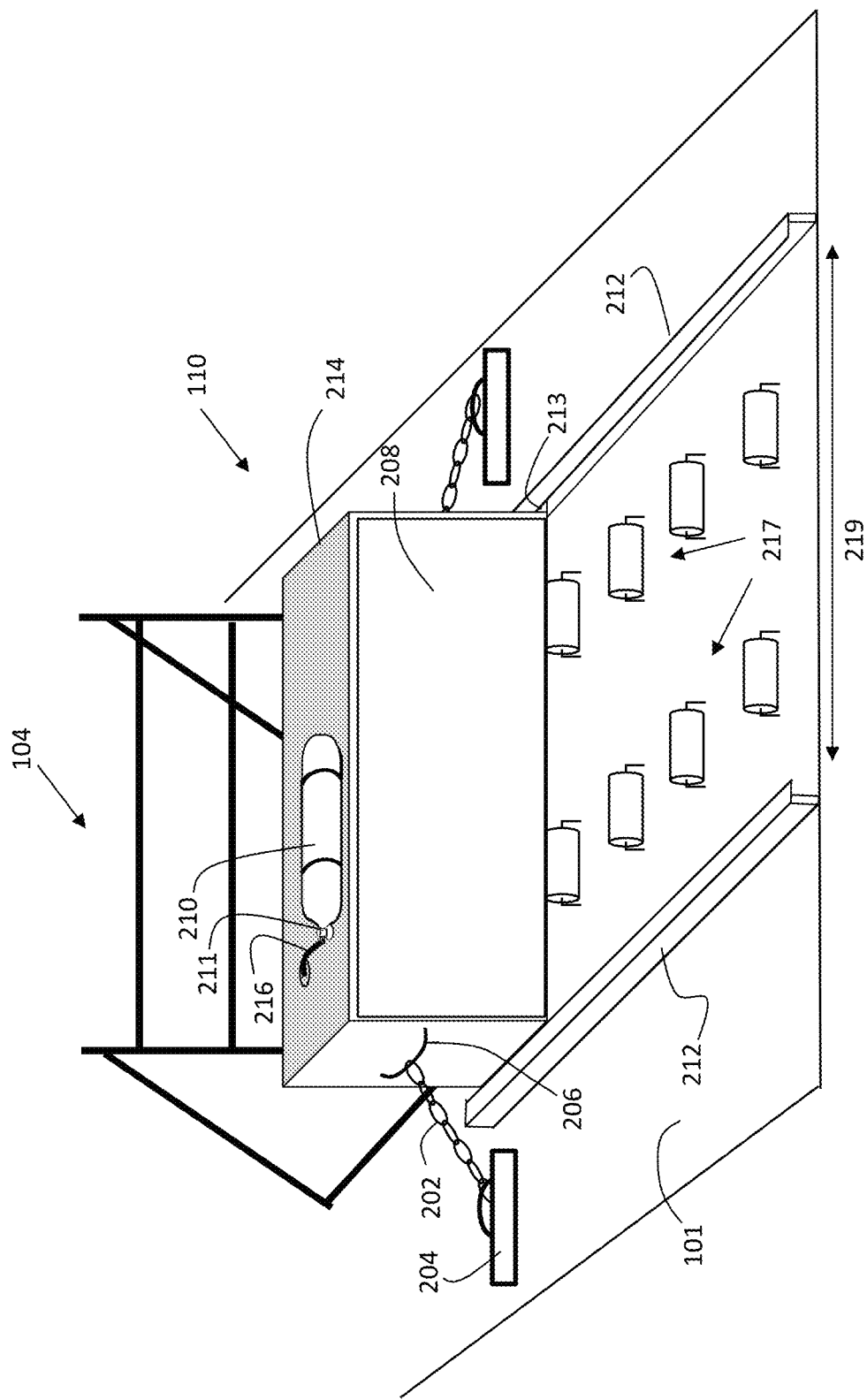
FIG. 2 illustrates a perspective view of the pneumatic delivery device according to one embodiment disclosed herein.

Turning now to FIG. 2, FIG. 2 illustrates a perspective view of the PDD positioned on the cargo floor 101 according to one embodiment disclosed herein. In FIG. 2, the CDS bundles are not shown. The PDD 110, in turn, is positioned in front of the BSA 104. Thus, the BSA provides a stationary structure that the PDD can exert force against when it deploys and pushes against the CDS bundles. The BSA 104 may comprise various vertical and horizontal structures, which typically are made of metal, such as tubular metal or angle stock metal welded or bolted together. Various bracing or cross members may be used to strengthen the structure.

The BSA ensures that the PDD 110 (and CDS bundles) does not slide forward. Nevertheless, the PDD itself is also secured to the aircraft. Specifically, the PDD comprises handles 206, each of which are connected to a restraint, which in the embodiment shown may be a chain 202 secured to a mount 204 in the cargo floorboard. The PDD 110 can be also secured and constrained by means of two rails 212 integrated into the floorboard of the aircraft.

The two rails have an inverted "L" shape that engage with the PDD (as well as the CDS bundles). The rails aid in securing the PDD and CDS bundles from lateral as well as vertical movement. In one embodiment, the spacing between the rails 219 is 48.75". The PDD may include one or more flanges 213 (see also FIG. 7 for another embodiment) which engage underneath a lip of the rail to prevent upward movement. In other embodiments, other structures or components may be used in addition to, or in lieu of, the two rails for affixing the CDS bundles in place.

The PDD is comprised of three main components, a case structure, a ram device movable with respect to the case structure, and a cargo ejection device for moving the ram with respect to the case structure. In one embodiment the PDD 110 may be a structural frame having an open cavity for storing a moveable ram. The PDD may further have a ram configured to move in a lateral direction from the structural frame and contact a pallet thereby imparting a force to the pallet to accelerate the pallet as the ram continues to move. In a further embodiment the PDD 110 comprises an outer case 214 and an moveable drawer-like shaped ram 208. In one embodiment, both structures are open box-like structures. In other words, each is analogous in shape to an open rectangular box, without a side, where the moveable ram 208 is positioned inside the case 214 when the ram is in a closed position. In other embodiments, the outer case 214 is an open-box like structure and the moveable ram may be an enclosed box. Other shapes and configurations for the structures may be used. The moveable ram 208 is sized so that it can be inserted into and slide within the outer case 214. Typically, these components are made from aluminum, although other materials can be used.

As will be discussed in greater detail below, various embodiments incorporate an ejection mechanism comprising an inflatable airbag within the case 214 to move the ram 208 in a lateral direction upon inflation. In one embodiment both the case 214 and the ram 208 have a planar structure perpendicular to the cargo hold floor. The planar structure of the case 214 is fixed in position, and provides a surface against which the inflated airbag presses against. The airbag also presses against, and moves, a planar surface of the ram 214. The ram, in turn, may press against the pallets of the CDS bundle (not shown in FIG. 2). In other embodiments, other shapes and configurations for the ram can be used. For example, the ram 208 could be a cylindrical bar, conical wedge or other geometric shape. In still other embodiments, the ejection mechanism may employ a piston arrangement that could be used to move the ram 208 relative to the case 214.

In one embodiment, the PDD comprises a pressurized tank 210, that includes a regulator 211 connected to a hose 216. The hose 216 passes through a hole in the case 214 into an airbag (not shown in FIG. 2). As the desired time, the regulator is opened and pressurized gas, usually in the form of nitrogen, is released into the airbag. The airbag expands, and pushes out the moveable drawer-like ram 208. The pressurized tank 210 may hold 3-5 cubic feet of gas at a pressure of 100 pounds per square inch ("psi"). In certain embodiments, the tank 210 may hold 4 cubic feet of gas at 50-60 psi. Various combinations of the size of the tank 210 and the pressure are possible. A smaller tank may hold a greater pressure, but may be more expensive and may be made of steel. A larger tank under less pressure may be made of fiberglass and may also weigh and cost less than a steel tank.

The regulator 211 is actuated upon command and releases the gas from the tank 210 into the airbag. This can be accomplished by sending a signal from the computerized system determining the drop location (not shown in FIG. 2). The regulator 211 must be able to release a sufficient quantity of gas to the airbag to expand the ram 214 at a desirable rate. After the airbag has expanded, any remaining gas in the airbag and the tank is bled off. This allows the ram 208 to be retracted back into the case 214 after deployment. The regulator 211 can be an electro-mechanical assembly, or any other form known to those skilled in the art. Typically, the regulator 211 is configured to release gas upon receiving a signal from the computer system coordinating the cargo airdrop.

In other embodiments, the system could be hydraulic or a combination of hydraulic and pneumatic in operation. A pressurized tank holding fluid can be used to exert force to cause the ram 208 component to move. Specifically, a hydraulic piston could be used, or other configurations for converting pressurized fluid to a motion. In other embodiments, an electric motorized structure could be used to provide the necessary displacement.

In other embodiments, the pressurized gas could be provided by an external source, as opposed to an integrated gas cylinder. The compressed air source could be provided by an external tank, or an external pressurized gas source, such as from engine bleed air.

In other embodiments, the PDD assembly 110 may be positioned on a series of rollers 217, which are integrated into the floor 101. The rollers allow the CDS cargo to roll on during loading, and roll out when ejected by the PDD assembly. The rollers 217 may also support the ram 208 when deployed.

Figure 3B:
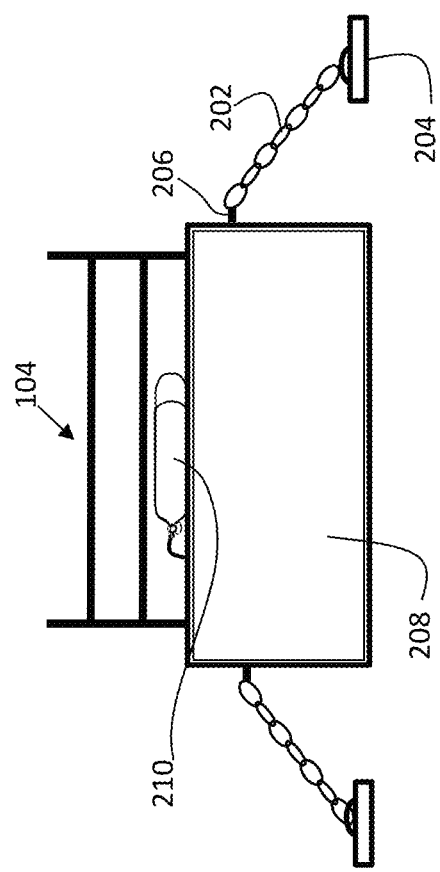
FIGS. 3A and 3B illustrate a side view and a front view, respectively, of the pneumatic delivery device according to one embodiment disclosed herein.
Figure 3A:
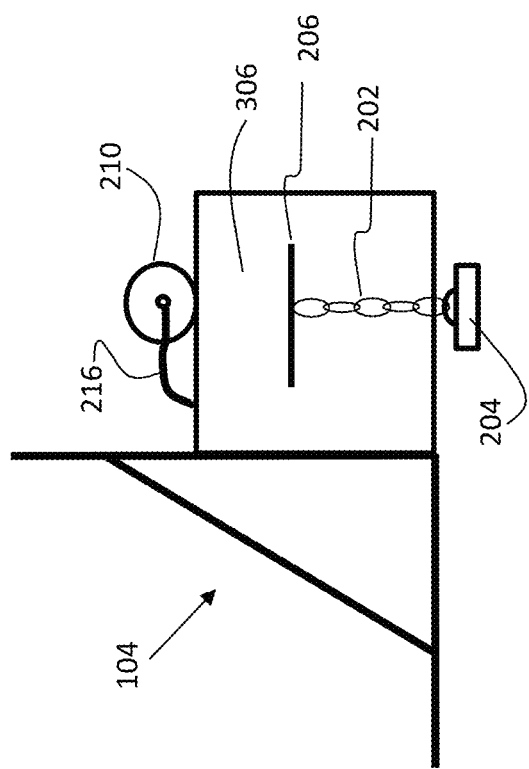

FIGS. 3A and 3B illustrate a side view and a front view, respectively, of an embodiment of a pneumatic delivery device 110 and the BSA 104 according to one embodiment disclosed herein. The same components that were described above in conjunction with FIG. 2 are shown, and are not reviewed again. The size of the PDD 110 in one embodiment is approximately four feet wide, one foot high, and one foot deep. Thus, side panel 306 is approximately 1'×1' and the front panel 208 is approximately 4'×1'. Other dimensions can be used. In this configuration, approximately 4 cubic feet of space exists in the case 214, which is the approximate space that the airbag should expand to when filled with the pressurized gas. Smaller or larger sizes of the case 214 will require a correspondingly lesser or greater amount of compressed gas to move the ram 208 aft. In one embodiment, the ram 208 is at least partially, if not wholly, contained in the case 214 prior to deployment. When deployed, the ram extends at least partially from the case 214.

Figure 4:
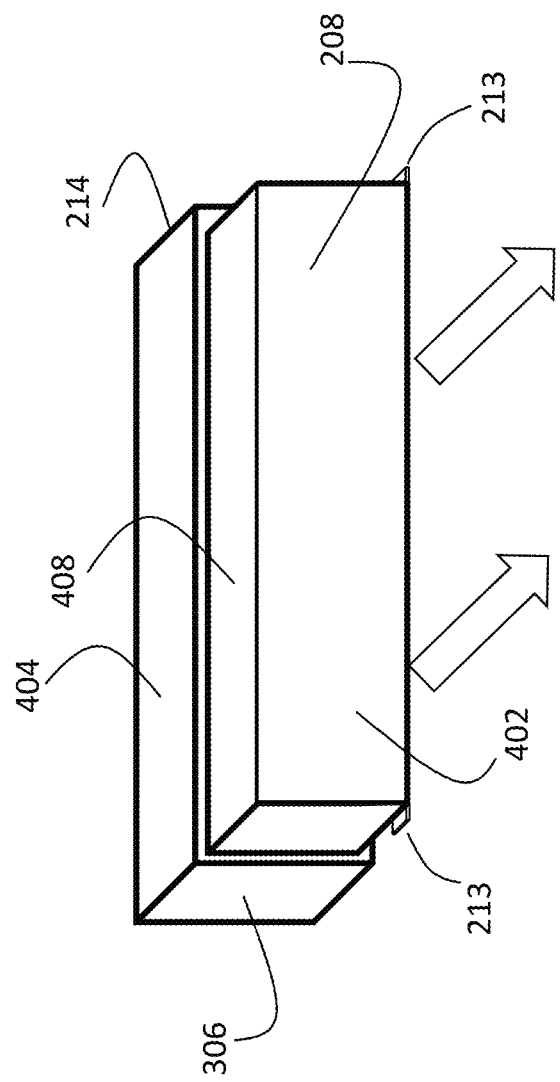
FIG. 4 illustrates a perspective view of components of the pneumatic delivery device according to one embodiment disclosed herein.

FIG. 4 illustrates an embodiment of case 214 and ram 208 of the PDD where the ram 208 is forced outwards and slides out from the case 214 as the ejection mechanism is activated. In this depiction, the structure of the case 214 with respect to the ram 208 can be better appreciated. The dimensions of the ram are such that it can easily slide within the case 214 without excessive play. Thus side panel 306 should be slightly larger than side panel 402. Similarly, top panel 404 should be larger than panel 408. Typically the gap between the ram and the case is less than 0.5". Other embodiments may have a larger or smaller gap. The flanges 213 on each side are shown and engage under the rail to ensure the ram moves in a linear direction.

Figure 7:
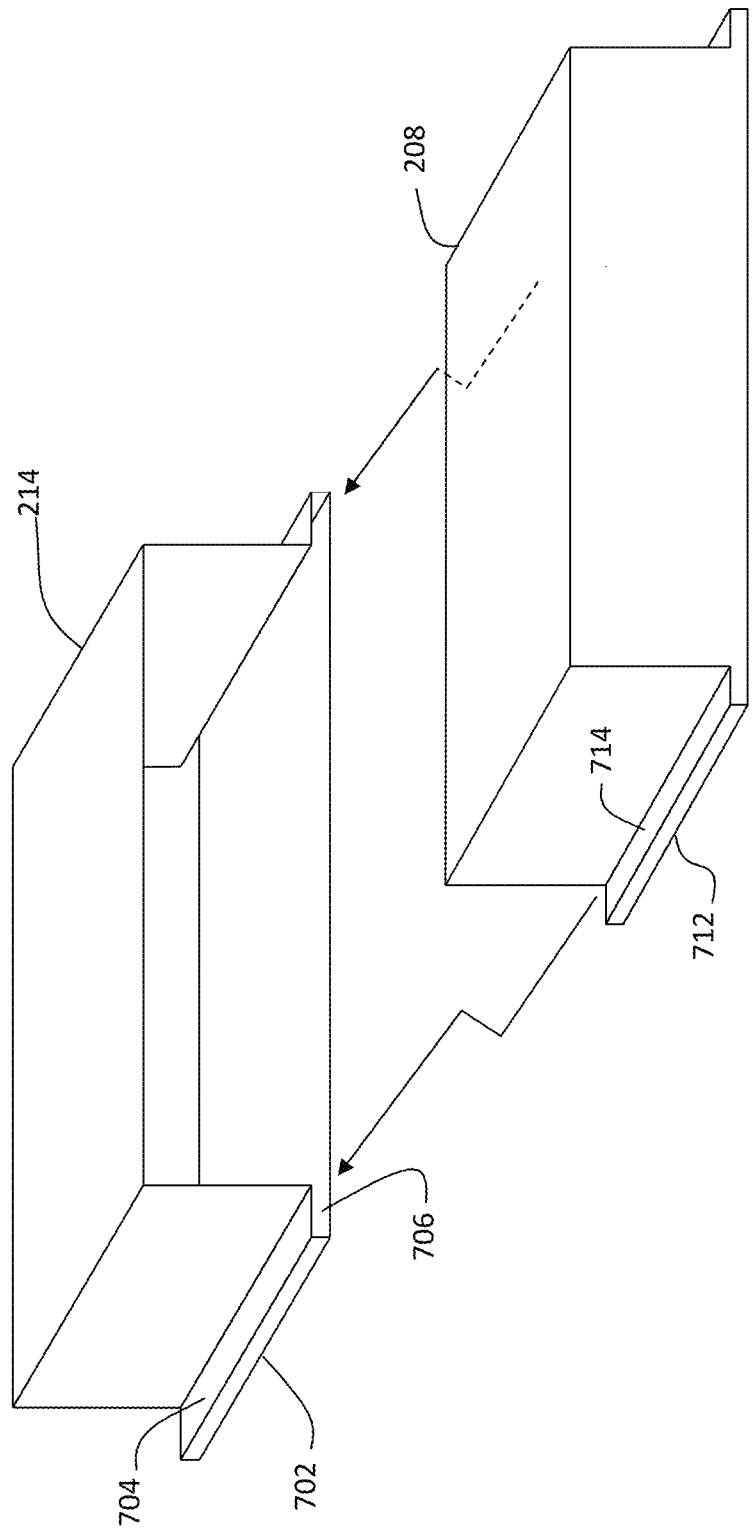
FIG. 7 illustrates another embodiment of the components of the pneumatic delivery device according to one embodiment disclosed herein.

Another embodiment of the case 214 and ram 208 components are illustrated in FIG. 7. FIG. 7 depicts a case 214 which is configured with a flange formed at each side. The flange 702 may be formed by bending sheet metal to form a channel 706. The flange 702 provides two functions. First, the top surface 704 of the flange may be positioned under the rail (not shown in FIG. 7) to prevent upward movement of the case 214. Thus, the flange serves as an additional means of securing the case in addition to the chains (not shown in FIG. 7). Second, the channel 706 functions to receive a correspondingly shaped flange 712 formed on the ram 208. Thus, the channel 706 functions to guide the ram 208 when it moves aft during deployment.

In one embodiment the ram 208 in FIG. 7 may have a similar shaped flange 712 formed on each side, but which is smaller so as to slide within the channel 706 of the case 214. The top surface 714 of the ram flange engages within the channel 706 to secure the ram when the ram is not deployed. When the ram is deployed, the flange 712 also functions to retain the ram within the rails. Suitable lubrication, such as grease, may be used between the flange 712 of the ram to facilitate sliding within the channel 706 of the case 214.

The embodiment of the ram and case in FIG. 7 is but one variation on the shapes that these two structures may have, and those skilled in the art will recognize that other shapes and configurations are possible. For example, the case 214 is shown as having a bottom panel, but it could have been formed without a bottom panel, or with stretchers instead.

FIGS. 5A and 5B illustrate a side view of the PDD at two different stages of deployment according to one embodiment disclosed herein. FIG. 5A depicts the case 214a and ram 208a in a pre-deployment state. The ram and case may be positioned on several of the rollers 217a-217e. In one embodiment a ejection mechanism may include an airbag 502a in an unpressurized state. The amount of space required for the airbag can vary, and FIG. 5A is not necessarily drawn to scale with respect to the amount of room required by the airbag 502a.

In one embodiment shown in FIG. 5A, the ram 208a has a surface 503 which is pressed onto by the airbag 502a as the airbag inflates. Thus, when the ram 208 is in the "closed" position (e.g., non-deployed position), there is a gap between the ram 208 and the case 214. In other embodiments, the ram 208 may not have a backside 503 (not shown in FIGS. 5A and 5B). In this embodiment, the airbag could extend into the ram 208 and press against the inside of the face 504 of the ram 208. This would allow the inside space of the case to be used to store the airbag 502.

The airbag 502 is connected to the hose 216, which in turn is connected to the pressurized tank 210. The airbag 502 may be constructed of various fabrics, including nylon, polyester, polyetherketone (PEK) or polyetheretherketone (PEEK). One consideration for selection of the airbag fabric is durability.

FIG. 5B illustrates the movement of the ram 208b when the airbag 502b deploys. The pressurized gas from the tank 210 is directed to the airbag 502b causing it to expand, and pushing against the side of the ram 208b. The ram slides out laterally and pushes against the CDS bundles (not shown in FIGS. 5A and 5B). The ram may be supported by one or more rollers 217a-217e as it moves aft.

A stop 510 in the ram is configured to contact a catch 514 so that the ram does not extend past the case 214b. In other embodiments, a chain or other linkage may limit the movement of the ram. It is desirable that the ram not be expelled from the case 214 after deployment. This would cause the ram to freely move about in the cargo hold. The ram should be removable, however, for maintenance and inspection. Specifically, removal of the ram may be required to inspect and maintain the airbag.

In other embodiments a locking mechanism can be deployed on the ram 208 to prevent its deployment in undesirable circumstances. For example, during loading and transport, the ram 208 may be kept locked. If locked, then the locking mechanism should be unlocked prior to deployment of the PDD.

Figure 6:
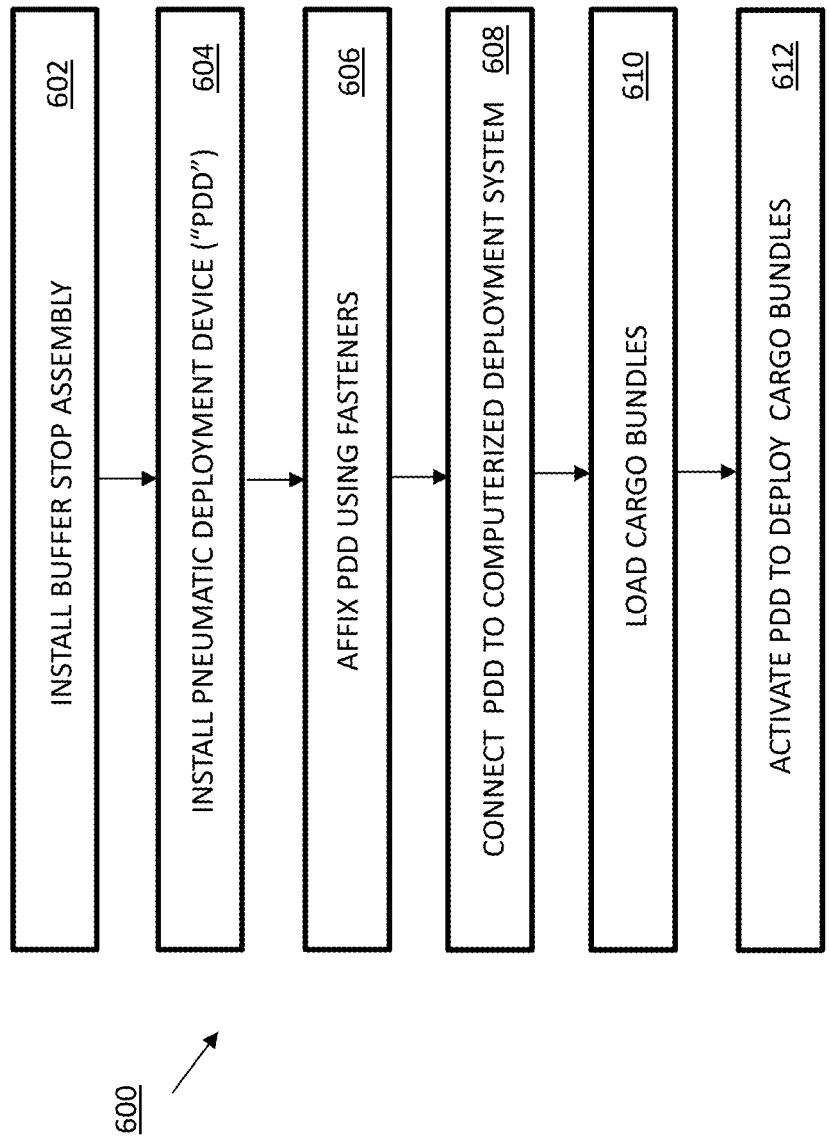
FIG. 6 illustrates a process for installing and using the pneumatic delivery device according to one embodiment disclosed herein.

Turning now to FIG. 6, FIG. 6 illustrates an embodiment for a process for installing and using the pneumatic delivery device according to embodiments disclosed herein. The process may begin in operation 602 with the installation of the buffer stop assembly in the cargo aircraft, if it is not already present. The location of the buffer stop assembly along the length of the cargo hold may depend on the number of CDS bundles that are to be deployed. Next, in operation 604, the PDD assembly may be installed and positioned against the buffer stop assembly. As depicted in FIG. 1, the PDD is designed to be located between the buffer stop assembly and the CDS bundles.

In operation 606, the PDD may be affixed to the aircraft. This can be done using chains, straps, or other types of fastener devices. Affixing the PDD to the aircraft ensures that the PDD is secured and does not move about during flight. Specifically, the PDD 110 should be prevented from rolling out of the cargo hold once the CDS bundles exit the aircraft.

In operation 608, the PDD may be connected to the computerized deployment system. The computerized deployment system sends a signal which opens the regulator and causes the pressurized gas to be released to the airbag. This may occur contemporaneously, or nearly so, with the release of the strap holding the CDS bundles. The regulator can be a mechanical assembly controlled by a motor, solenoid, or other electro-mechanical assembly. The regulator must be able to release the pressurized gas sufficiently fast enough so that ram moves at a rate sufficient to accelerate at least one CDS pallet as desired. If the ram moves slowly, a sufficient increase in CDS deployment may not be achieved.

In operation 610, the CDS bundles may be loaded, with the first loaded bundle positioned against the PDD. The first loaded bundle will be the last deployed bundle from the aircraft during the airdrop. After all the CDS bundles are loaded and the retaining strap is in place, the cargo aircraft can depart to the drop zone.

Once over the drop zone, the activation of the PDD in operation 612 occurs. The process 600 presumes that the other necessary steps have been performed as required, such as opening the cargo ramp and door prior to deploying the PDD, unlocking the ram (if such locking mechanism is present), determining the proper location, releasing the cargo strap, etc. As noted previously, the deployment of the PDD may occur simultaneously with the release of the cargo strap. Both the deployment of the PDD and the release of the cargo strap may be controlled by the same computerized system.

Those skilled in the art will recognize that the concepts and technology presented herein can be embodied in various ways. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A system for deploying cargo from an aircraft, comprising:
    rails integrated into an aircraft floor;
    a structural frame having structural frame flanges on opposing sides of the structural frame, the structural frame flanges configured for attachment to the aircraft floor via the rails;
    a movable ram connected to the structural frame having movable ram flanges on opposing sides of the movable ram, the moveable ram flanges both attached to the rails and configured to move along the rails attached to the aircraft floor from a first ram position to an aft ram position; and
    an ejection mechanism connected to the structural frame and the movable ram, the ejection mechanism configured to move the movable ram in an aft direction thereby configured to accelerate a cargo container from a first container position to a second container position.

2. The system of claim 1, further comprising:
    an airbag configured to receive compressed gas and expand within a volume of the structural frame.

3. The system of claim 2, wherein the airbag is contained within the structural frame and the movable ram.

4. The system of claim 3, wherein the structural frame is configured to receive the movable ram and the movable ram flanges.

5. The system of claim 4, wherein the movable ram comprises a vertically oriented planar structure configured to contact a pallet of the cargo container.

6. The system of claim 2, further comprising a container storing the compressed gas and configured to provide the compressed gas to the airbag.

7. The system of claim 6, further comprising a regulator to control the flow of compressed gas into the airbag and configured to release the compressed gas upon receipt of a signal from a computer coordinating deployment of the cargo.

8. The system of claim 1, wherein the movable ram and movable ram flanges are at least partially contained inside the structural frame when the movable ram is in the first ram position, and the movable ram is deployed from the structural frame when it is in the aft ram position.

9. A pneumatic delivery deployment device comprising:
    a pair of rails integral with an aircraft floor of a cargo aircraft;

a structure having flanges being configured to be affixed to the cargo aircraft via the pair of rails;

a ram having ram flanges slideably engaged with the rails, the ram configured to engage a cargo element and movably coupled to the structure configured to slideably disengage with the structure; and an airbag configured to inflate upon receiving pressurized gas located between the structure and the ram, wherein upon inflation the airbag accelerates the ram from the fixed structure.

10. The pneumatic delivery deployment device of claim 9, further comprising:

a pressure containment vessel configured to contain pressurized gas;

a regulator configured to control a release of the pressurized gas; and a hose configured to convey the released pressurized gas to the airbag.

11. The pneumatic delivery deployment device of claim 10, wherein the airbag is positioned between the structure and the ram.

12. The pneumatic delivery deployment device of claim 11, wherein the airbag is configured to inflate to a volume of at least 3 cubic feet.

13. The pneumatic delivery deployment device of claim 10, wherein the regulator is configured to deflate the airbag after the airbag has inflated.

14. A method for deploying cargo comprising one or more container delivery system ("CDS") bundles comprising the operations of:

flying a cargo aircraft conveying a plurality of CDS bundles slideably engaged within a rail system in a floor of the cargo aircraft; and inflating an airbag positioned between a structure having structure flanges on opposing sides of the structure secured within the rail system in the floor, and a moveable ram at least partially contained within the structure having movable ram flanges on opposing sides of the moveable ram, the moveable ram flanges being slideably engaged within the rail system in the floor of the cargo aircraft, and moving the movable ram from the structure and along the rail system to contact a cargo pallet thereby accelerating the moveable ram and causing at least one of the CDS bundles to accelerate.

15. The method of claim 14 further comprising the operations of:

installing the pneumatic deployment device ("PDD") in a cargo hold of the cargo aircraft, the PDD comprising the structure and the moveable ram, wherein the structure and the moveable ram are positioned vertically with respect to a floor of the cargo aircraft;

affixing the structure to the aircraft; and positioning the one or more container delivery system ("CDS") bundles in a linear manner such that the first installed CDS bundle is positioned adjacent to the PDD.

16. The method of claim 14, wherein deploying the PDD comprises releasing pressurized gas from a containment vessel thereby inflating the airbag positioned between the structure and the moveable ram.

17. The method of claim 15, wherein the airbag moves the moveable ram away from the structure.

18. The method of claim 15, further comprising:

receiving a signal at the PDD from a computer coordinating the cargo deployment and deploying the PDD in response to receiving the signal.

* * * * *